United States Patent [19]

Annas, Sr.

[11] 4,102,729

[45] Jul. 25, 1978

[54] APPARATUS FOR HANDLING STOCKINGS

[75] Inventor: Dulin Land Annas, Sr., Hickory, N.C.

[73] Assignee: Speizman Industries, Inc., Charlotte, N.C.

[21] Appl. No.: 792,264

[22] Filed: Apr. 29, 1977

[51] Int. Cl.[2] .................... B23P 19/02; B23P 11/00; B65C 5/00

[52] U.S. Cl. .................... 156/384; 156/484; 156/542; 29/235; 29/243.56; 93/87

[58] Field of Search .............. 156/475, 483, 484, 542, 156/443, 212, 384; 53/134, 137, 138; 93/87; 223/85; 29/235, 243.56

[56] References Cited

U.S. PATENT DOCUMENTS

| | | | |
|---|---|---|---|
| 2,501,539 | 3/1950 | Ruth | 156/542 |
| 2,690,104 | 9/1954 | Schwartz et al. | 156/475 |
| 2,759,283 | 8/1956 | Bowman et al. | 156/542 |
| 2,889,066 | 6/1959 | Alberty | 156/475 |
| 3,954,543 | 5/1976 | Messmer | 156/542 |

*Primary Examiner*—Douglas J. Drummond
*Attorney, Agent, or Firm*—Richards, Shefte & Pinckney

[57] ABSTRACT

Stocking handling apparatus having carrier plates on which pairs of stockings are indexed transversely from a loading station through label and transfer applying stations to a folding station. A label folding mechanism receives an adhesive coated label at the label applying station and positions it at the end portion of a pair of stockings on the carrier plate and folds the label thereover to adhere it thereto. At the transfer applying station a transfer strip is fed under a holddown frame that positions the strip on the top stocking of the pair while a hot transfer iron moves against the transfer strip to transfer the indicia therefrom to the stocking. A stocking folding rod lifts the pair of stockings from the carrier plate at the folding station in folded condition over the rod and transports the folded stockings through a passage between spaced opposed walls to a hanger clip inserting station at which a mechanism inserts hanger clips in the fold of the stocking with the folding rod having a slot facing the fold to accommodate receipt of a portion of the hanger clip and the passage walls being spaced close enough to apply resistance to movement of the stockings to tension the stockings on the rod to prevent displacement during hanger clip insertion. The stockings are discharged to a collection station by withdrawal of the rod and downward pivoting of a section of the wall under the stockings with a conveyor transporting stockings therefrom.

24 Claims, 24 Drawing Figures

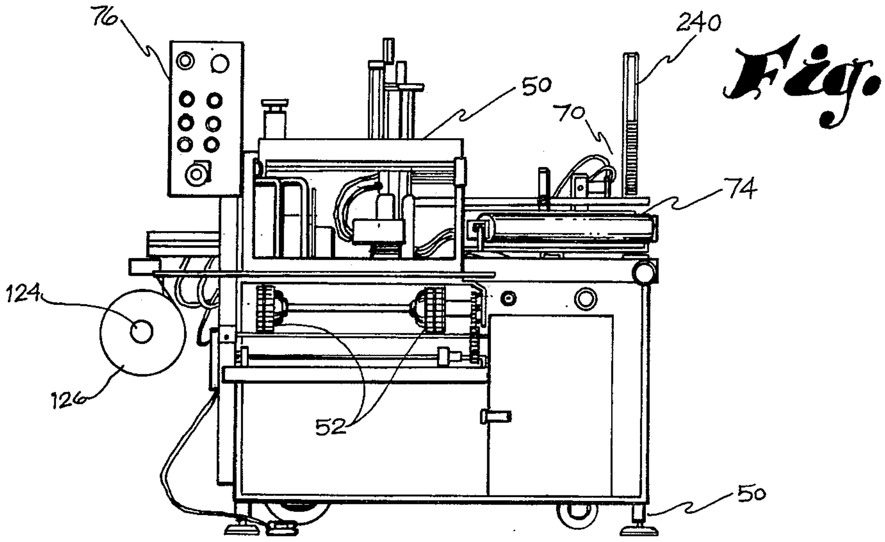
Fig. 3
Fig. 4
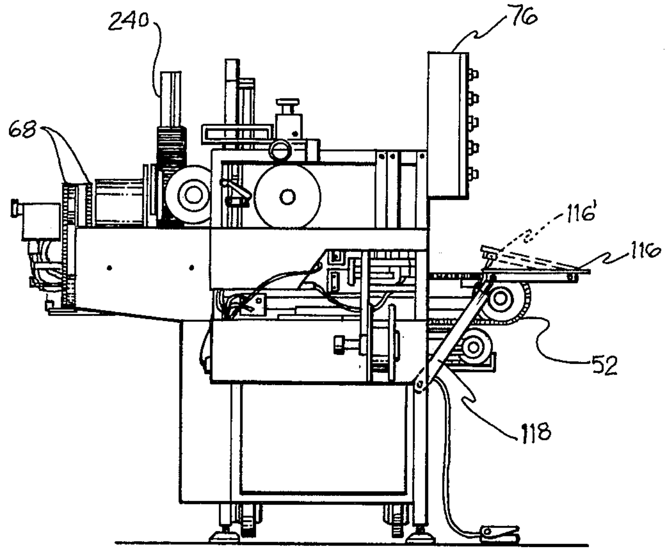
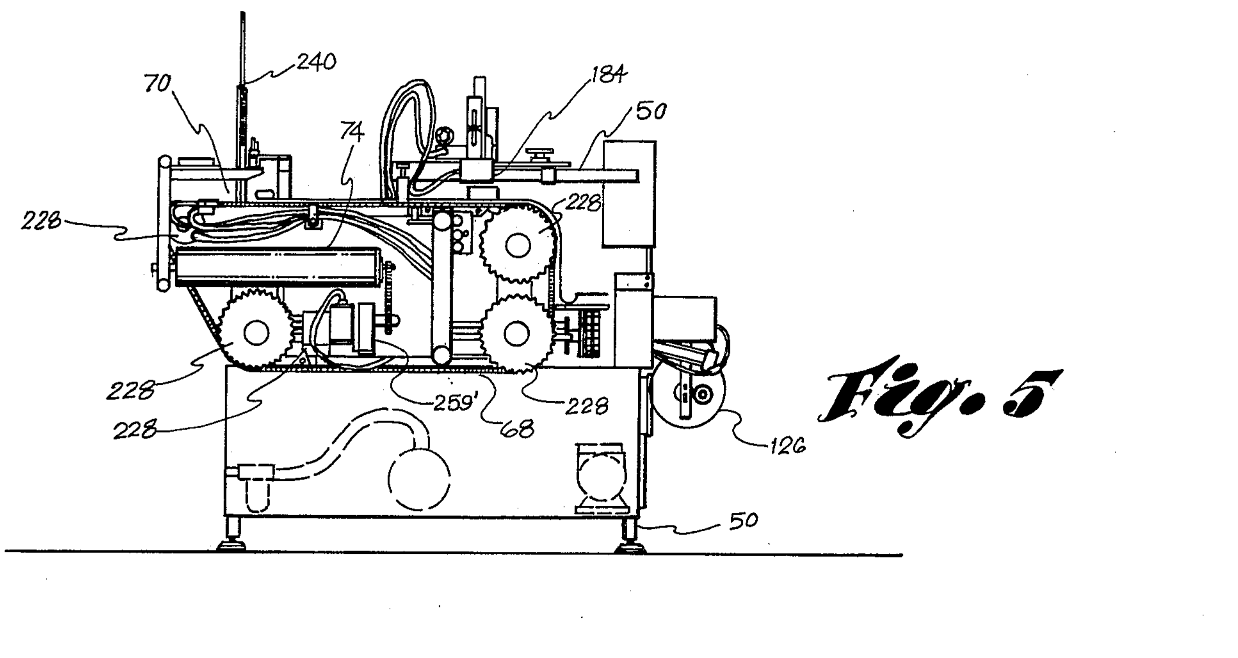
Fig. 5

Fig. 9
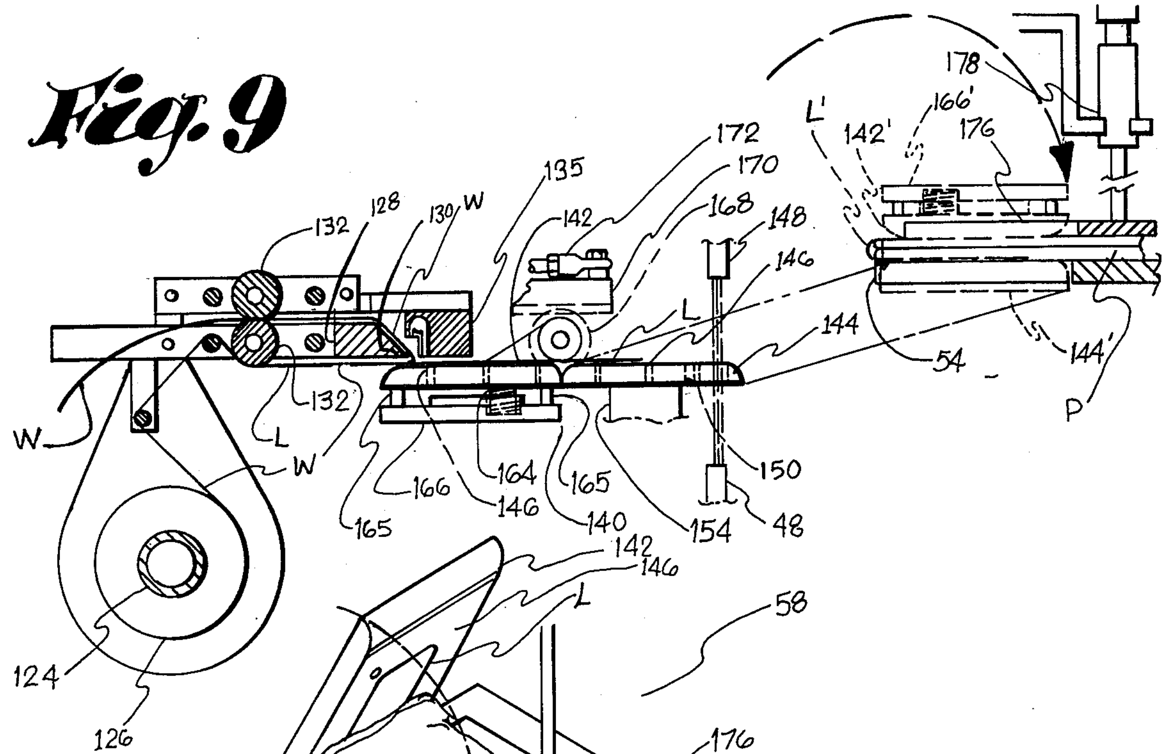
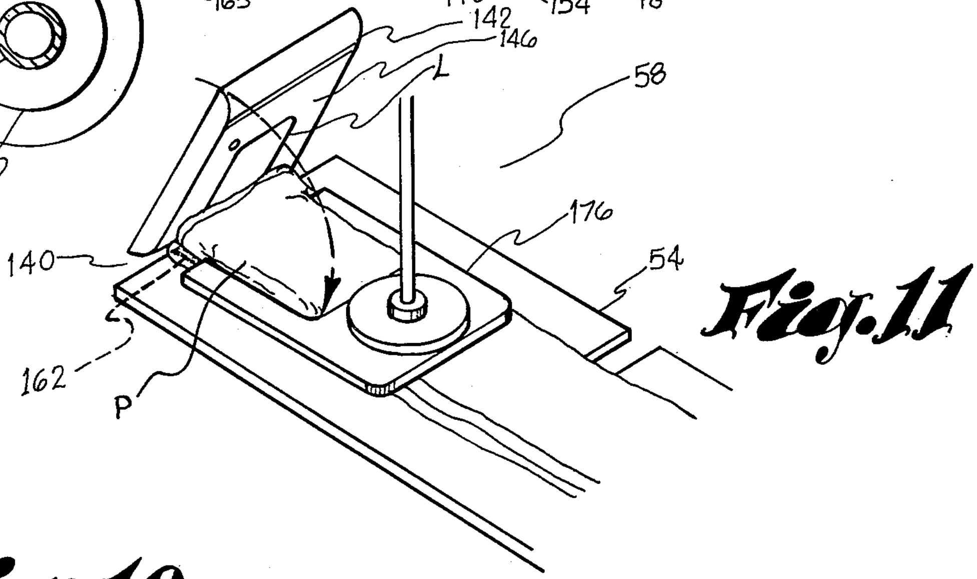
Fig. 11
Fig. 10
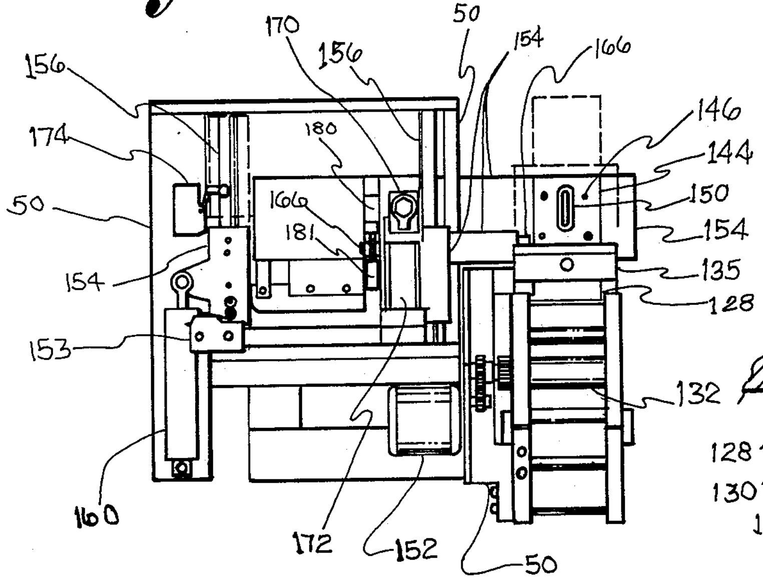
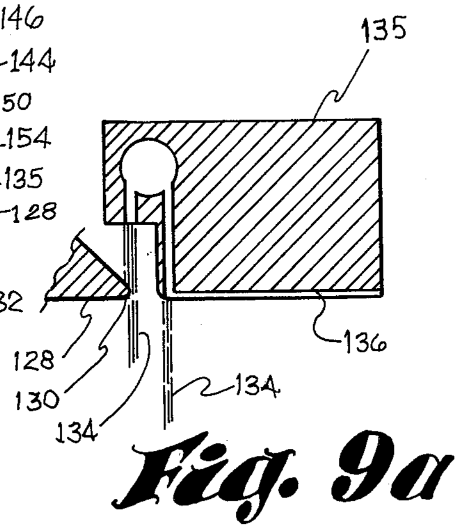
Fig. 9a

APPARATUS FOR HANDLING STOCKINGS

BACKGROUND OF THE INVENTION

The present invention relates to apparatus for handling stockings, and more particularly to apparatus for affixing labels, transfers, and hanger clips to stockings.

In the manufacture of stockings, and particularly men's half-hose, stockings are prepared for sale by arranging them in pairs and attaching a folded label or Ryder folded over the cuff end portion of the pair with adhesive on the label affixing it to both stockings to hold the pair together. A transfer is then applied to the sole portion of at least one of the stockings of the pair to provide necessary identification and information. The stockings are then folded across the heel portions and a hanger clip inserted at the fold so that the completed stocking pair can be hung on a rod of a display rack.

The label and transfer affixing operations are commonly performed manually and separately using manually operated devices such as a label-holding mechanism and a hot transfer iron, respectively. On the other hand, the folding and hanger clip inserting operations are usually performed totally by hand without the assistance of any mechanical devices.

In contrast, by the present operation all of the label and transfer affixing, folding and hanger clip inserting operations are performed automatically rather than manually and are preferably all performed on a single, compact apparatus onto which an operator places a pair of stockings to which labels and transfers are applied, the stockings are folded and hanger clips are inserted automatically without manual assistance and the completed stockings are discharged ready for sales display.

SUMMARY OF THE INVENTION

Briefly described, the present invention provides apparatus for handling stockings to affix labels, transfers and hanger clips using a carrier plate on which a pair of superposed stockings are supported and are conveyed transversely from a loading station through label and transfer applying stations to a folding station, with means being provided for indexing the carrier plate through the stations. At the label applying station, means are provided for engaging an end portion of a pair of stockings disposed at a side edge of the carrier plate and operable to fold an adhesive coated label over the end portion of the stockings and applying pressure thereto sufficient to cause the label to adhere to the end portions. At the transfer applying station, means are provided for transferring indicia from a transfer strip onto one of the stockings of the pair by a hot transfer iron. At the folding station, stocking folding means are provided for engagement under the pair of stockings intermediate their ends to lift the stockings from the carrier plate and thereby support the stockings in folded condition. The stocking-folding means is moved by means that cause the stocking-folding means to lift the stockings and to transport them to a hanger clip inserting station at which other means insert a hanger clip from a supply into the fold of the stocking. Finally, means are provided for discharging the stockings from the hanger clip inserting station to a collection station.

The preferred embodiment of the apparatus at the label applying station includes a folding mechanism that has base and folding portions that are movable from a label-receiving position spaced from the carrier plate to a label-applying position at the carrier plate with the mechanism moving obliquely under the carrier plate to position the base portion with the label thereon under the end portion of a pair of stockings on the carrier plate. Means are provided for positioning a label on the base and folding portions and an air jet is directed onto the label during this positioning to facilitate positioning. Suction is drawn through the base and folding portions to facilitate retention of the label on these portions as the folding mechanism is moved to label-applying position. The folding portion of the folding mechanism is pivotable from a label-receiving position adjacent and aligned with the base portion to a position facing the base portion and a pressure plate is mounted on the folding portion with spring means urging the plate outwardly so that upon pivoting of the folding portion a label carried thereon will be folded and adhered by pressure to the end portion of the stocking pair on the carrier plate.

The preferred form of the means for transferring indicia at the transfer applying station includes means for feeding a transfer strip to a movable transfer holddown frame that is open interiorly and is movable onto a stocking of the pair of stockings on the carrier plate. A hot transfer iron is movable into the holddown frame and against the transfer strip and stocking to accomplish the indicia transfer, and a spring means connect the holddown frame and hot transfer iron to apply a holddown pressure against the frame when the iron is in transferring position.

Folding of the stocking pair at the folding station is preferably accomplished by a horizontal rod that is movable vertically through a slot provided in the carrier plate intermediate its ends with means moving the rod vertically to lift the pair of stockings from the carrier plate and thereby support the stockings in folded condition and transport the rod and folded stockings to the clip inserting station through a passage defined by opposed and spaced passage-forming walls that extend vertically from the folding station and horizontally to the hanger clip inserting station. A side wall is connected to the passage-forming walls to close the side of the passage and engage stockings to maintain them on the rod in proper hanger clip inserting and discharge position in the passage. One of the passage forming walls has a horizontal section disposed under the stockings at the hanger clip inserting station and is movable to open the passage for discharge of stockings to the collection station after hanger clip insertion. Further, the passage-forming walls are spaced apart a distance less than the unrestricted thickness of the stocking to provide resistance and to tension the stockings over the rod at the hanger clip inserting station to prevent displacement of the stockings along the rod during the hanger clip insertion. Hanger clip insertion is also facilitated by an open slot formed in the rod facing the fold of the stocking to accommodate receipt of the portion of the hanger clip that is under the fold of the stocking.

Preferably, the hanger clip inserting mechanism includes a housing having a chamber that is aligned with and opening at the stocking fold. Means are provided for supplying clips into the chamber by support for a vertical stack of hanger clips with the lowermost clip in the chamber. A pusher element is reciprocated in the chamber to push the lowermost clip from the chamber into the stocking fold and reciprocation of the pusher element also results in feeding the next clip into the chamber.

After hanger clip insertion, the folding rod is withdrawn from the stocking and the horizontal wall section is moved, preferably by pivoting along one edge to allow the pair of stockings to slide onto a conveyor on which the stockings are discharged by transporting to a collection station.

In the preferred embodiment of the present invention, the various mechanisms and means described hereinabove are arranged in a single composite apparatus with the carrier plate arranged for indexing linearly from the loading station through the label and transfer applying stations, the folding means movable transversely to the linear movement of the carrier plate and the conveying means at the collection station conveying the stockings parallel with but opposite the linear movement of the plate, thereby providing a compact and simplified apparatus in which the finished stockings are delivered adjacent the loading station.

The present invention also contemplates within its scope the incorporation of the features and construction of the mechanisms and means of the individual stations as separate apparatus apart from the combination of stations.

BRIEF DESCRIPTION OF THE DRAWINGS

FIG. 3 is a front elevation of the machine of FIG. 1;

FIG. 4 is a left-side elevation of the machine of FIG. 1;

FIG. 5 is a rear elevation of the machine of FIG. 1;

Figure 1:
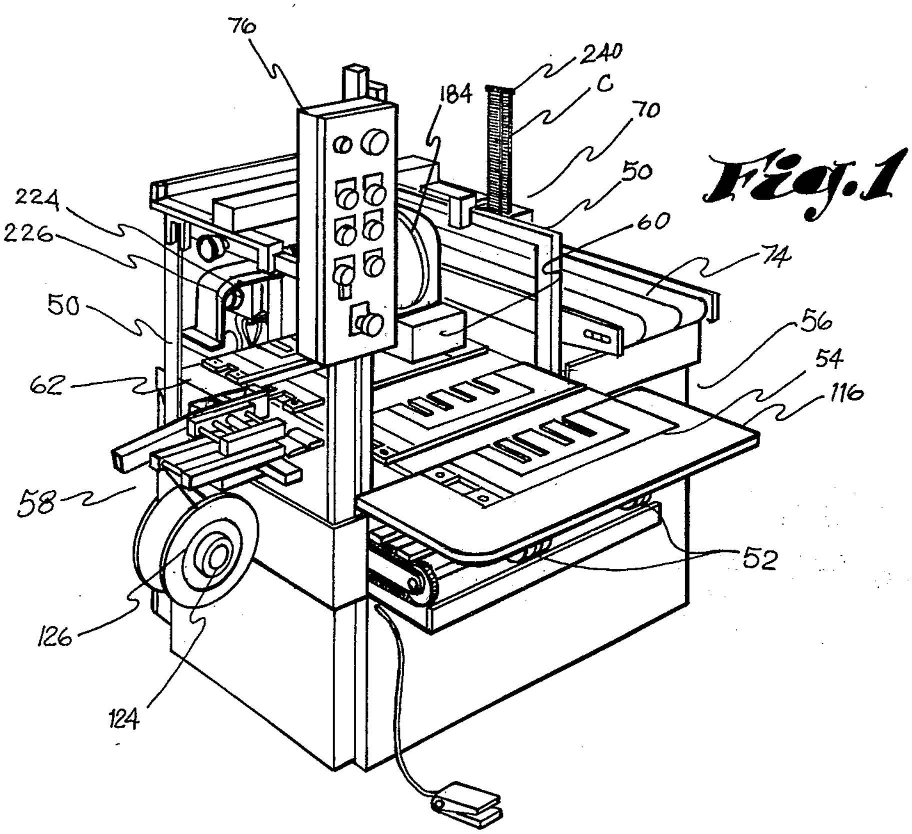
FIG. 1 is a perspective view of a machine embodying the preferred embodiment of the stocking handling apparatus of the present invention.
Figure 7:
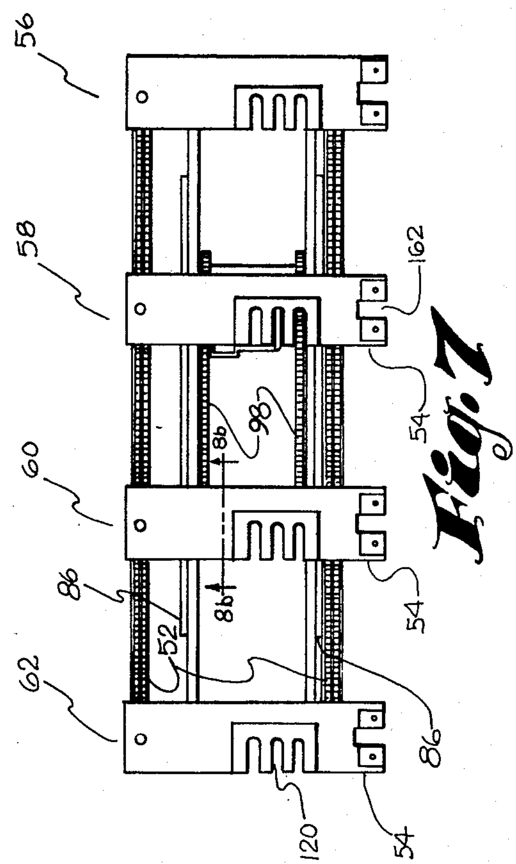
FIG. 7 is a plan view of the carrier plate supporting, advancing and indexing components of the machine of FIG. 1.
Figure 8:
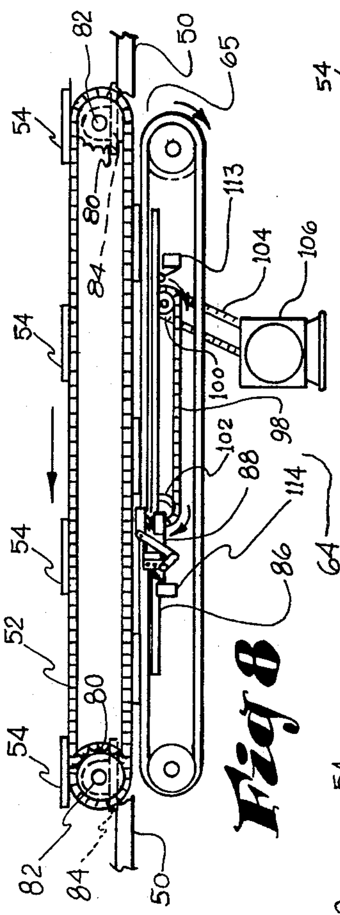
FIG. 8 is a left-side elevation of the components of FIG. 7.
Figure 8A:
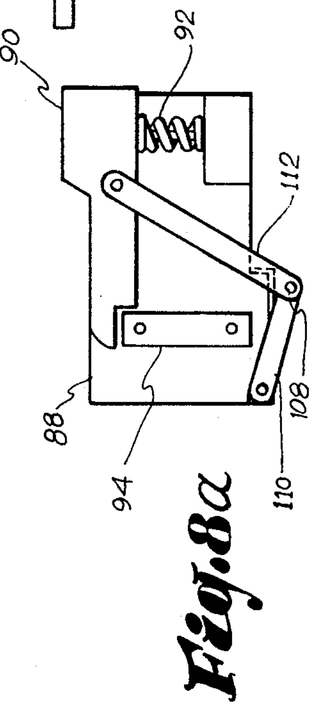
Figure 8B:
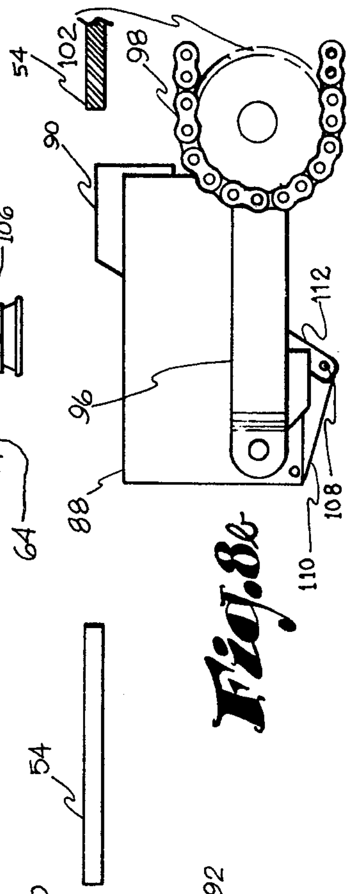

FIG. **8*a* is an enlargement of the indexing mechanism of FIG. 8**;

FIG. **8*b* is an enlarged view similar to FIG. 8*a*, but of the left-hand indexing mechanism as viewed along the line 8*a*—8*a* of FIG. 7**;

FIG. 9 is a vertical sectional view of the components of the machine of FIG. 1 at the label applying station thereof;

FIG. **9*a* is an enlarged view of the air jet guide block of FIG. 9*a*;**

Figure 12:
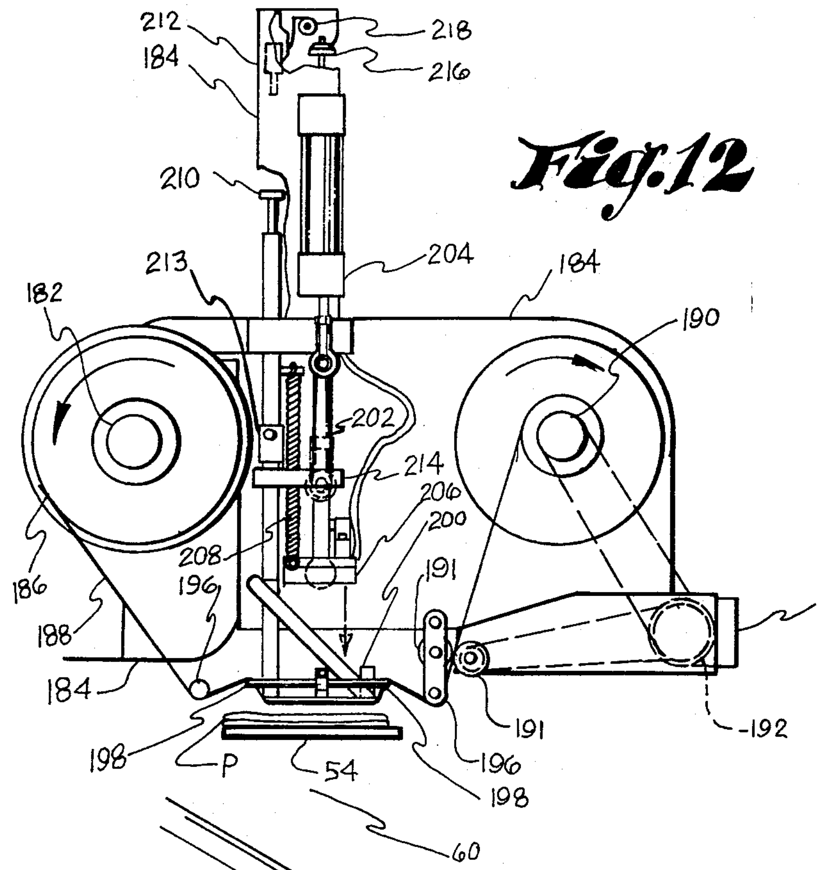
Figure 13:
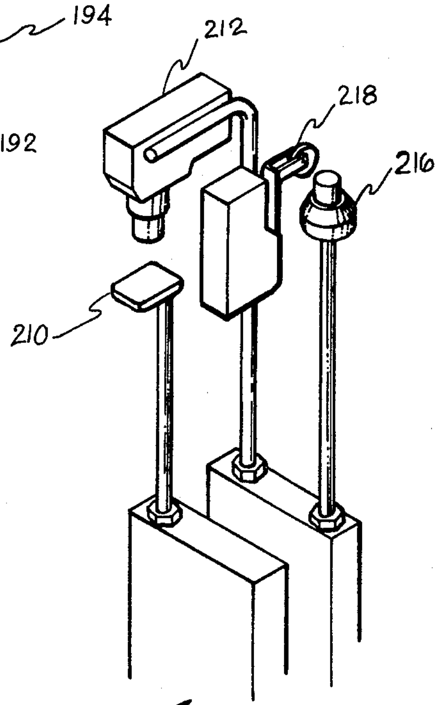
Figure 14:
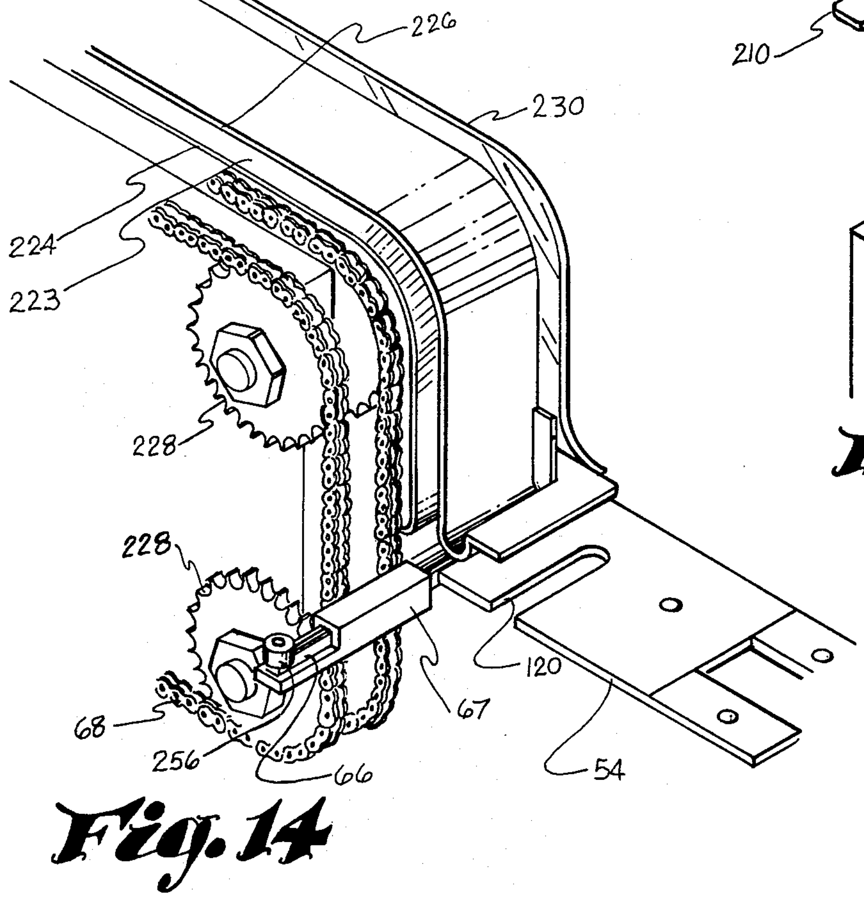
Figure 15:
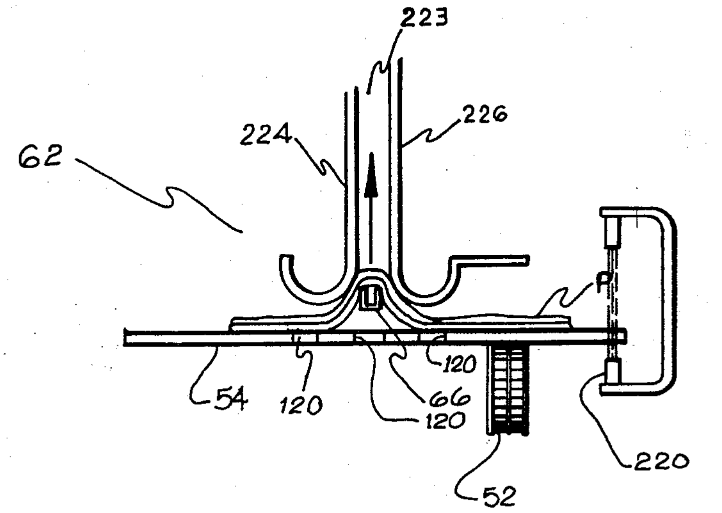
Figure 16:
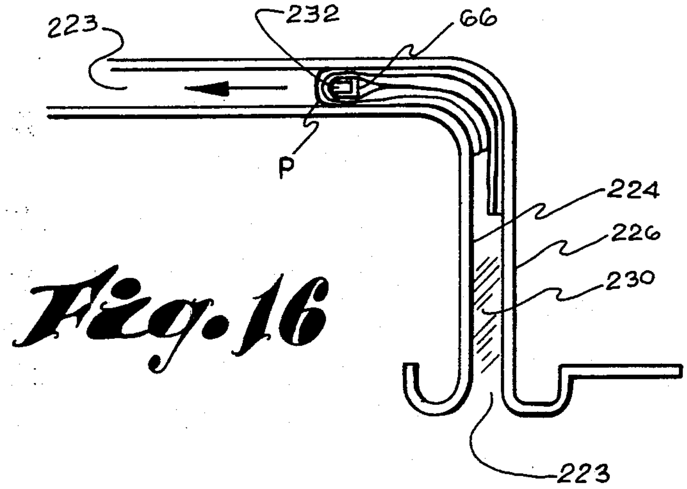
Figure 17:
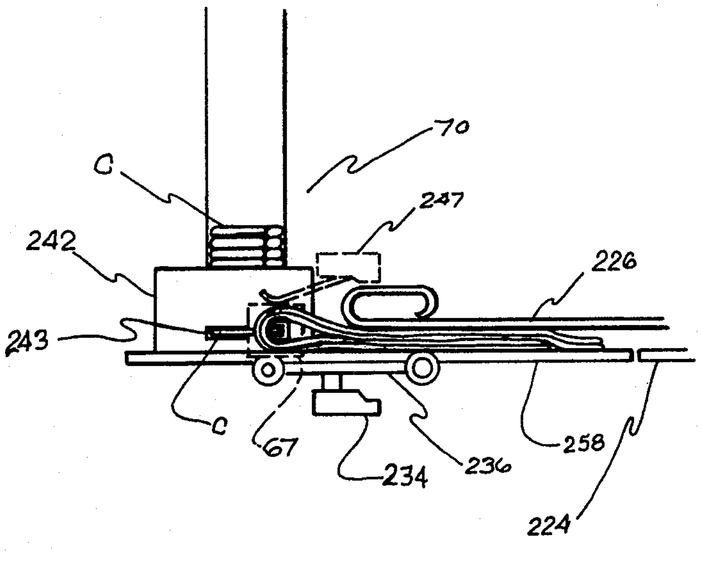
Figure 18:
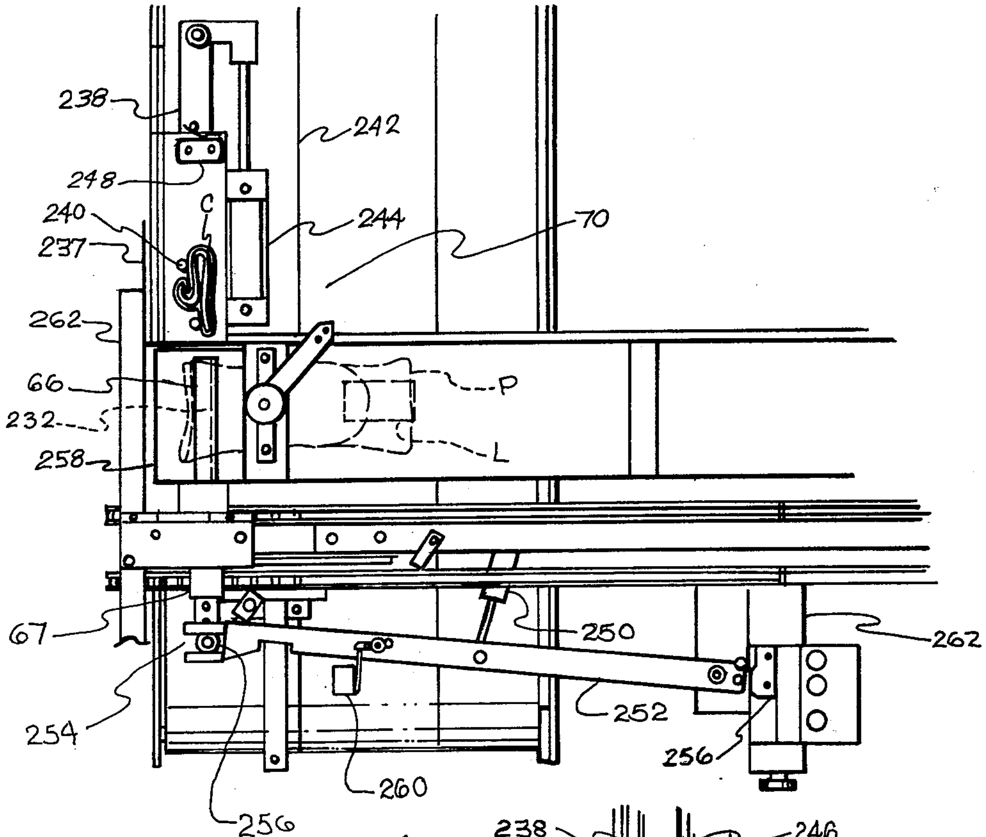
Figure 19:
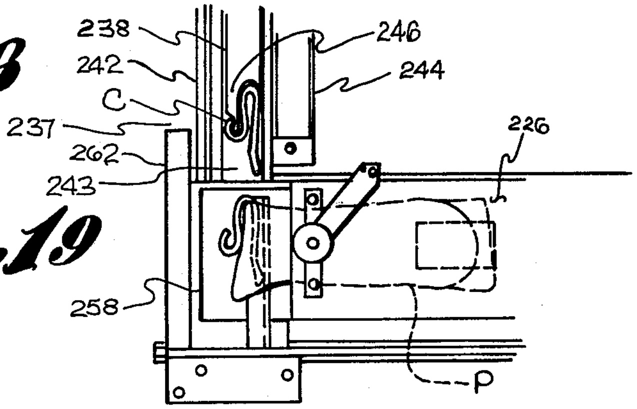
Figure 21:
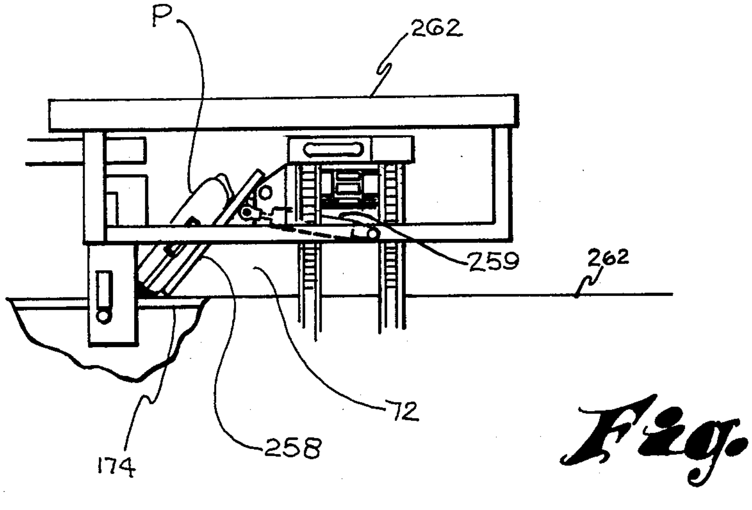
Figure 20:
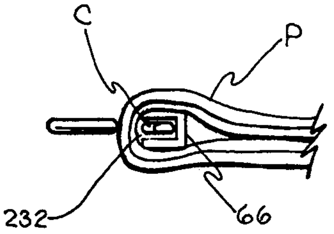

FIG. 10 is a plan view of the label applying station of FIG. 9;

FIG. 11 is an enlarged perspective view of the label folding action of the components of FIGS. 9 and 10;

FIG. 12 is a left-hand elevation of the components of the machine of FIG. 1 at the transfer applying station;

FIG. 13 is an enlarged perspective view of the control elements at the transfer applying station of FIG. 12;

FIG. 14 is an enlarged perspective view of the components of the machine of FIG. 1 at the stocking folding station thereof;

FIG. 15 is a diagrammatic view of the beginning of a stocking folding operation at the stocking folding station of the machine of FIG. 1;

FIG. 16 is an enlarged diagrammatic view of the components transporting the stocking from the stocking folding station to a clip inserting station of the machine of FIG. 1;

FIG. 17 is an enlarged diagrammatic view of the components of the machine of FIG. 1 at the hanger clip inserting station thereof;

FIG. 18 is a plan view of the components of the machine of FIG. 1 at the hanger clip inserting station;

FIG. 19 is a broken away portion of FIG. 18 showing various components exposed to illustrate the construction and operation of interior parts;

FIG. 20 is an enlarged elevation view of the fold of a pair of stockings supported on a folding rod and showing a hanger clip inserted in the stocking fold; and FIG. 21 is an enlarged right-side elevation of a portion of the components at the hanger clip inserting station of the machine of FIG. 1, partially broken away.

DESCRIPTION OF THE PREFERRED EMBODIMENT

Organization

The apparatus of the preferred embodiment of the present invention illustrated in the accompanying drawings provides advantageous automatic means for performing the last manufacturing operations on stockings before they are placed in containers for shipment. Stockings are loaded onto the apparatus by an operator or attendant placing two stockings as a superposed pair onto a carrier plate at a loading station at the front of the apparatus and the stockings are returned for placement in shipping containers at a collection station. The operations performed include loading the stocking pairs into the apparatus, folding self-adhering labels over the tops of the stocking pairs, applying transfers to the stockings, folding the stocking pairs, inserting hanger clips into the folds of the pairs, and discharging the folded pairs onto a conveyor for transport at the collection station.

This preferred embodiment of the invention has a frame 50 from which is supported a pair of roller chains 52 which carry seven elongated carrier plates 54 attached in equally spaced relation as flights across the chains 52 in horizontal flatwise disposition transverse to the chains for supporting and conveying pairs of superposed stockings P disposed transversely to the direction of chain advance. The upper reaches of the chains extend for positioning four plates thereat, with the plates located during dwell periods at four stations for performing the first four of the operations listed in the preceding paragraph and generally indicated by numerals as follows: a loading station 56, a label applying station 58, a transfer applying station 60, and a folding station 62. An indexing means 64 disposed below the return reaches of the chains 52 engages the plates 54 successively to advance the upper reaches of the chains 52 from front to rear of the frame 50, successively indexing each of the plates 54 (while V-belt support means 65 support the plates 54 at the ends thereof underneath the return reaches of the chains 52 to prevent sagging in the chains 52) to and through each of the stations 56, 58, 60 and 62 linearly, and dwelling between indexes for simultaneous performance of the first four of the operations listed in the preceding paragraph during each index cycle.

Stocking folding elements or rods 66 carried slidably in square tubes 67 by a second pair of roller chains 68 are disposed to extend frontwardly and at right angles therefrom to engage and lift pairs of stockings P from plates 54 dwelling at the folding station 62, thereby folding and supporting the stocking pairs P in folded condition and transporting them transversely across the rear of the frame 50 to a hanger clip inserting station generally indicated by the numeral 70. After hanger clip insertion, the rods 66 are disengaged from the stocking pairs P while the stockings are supported on discharge means 72, and thereafter the stocking pairs P are discharged thereby onto the conveying means 74 for transport to the front of the apparatus in a direction generally parallel to the movement of the plates 54 but opposite the movement of the upper plates 54.

A control box 76 supported from the frame 50 at the front thereof provides manually operable electrical switches for controlling the various apparatus functions and operations, and is suitably electrically connected to a control panel 78 mounted on the side of the frame 50. The control panel 78 is equipped with the usual relays and other electrical equipment for automatic control of the various functions and operations in conjunction with the necessary limit switches, solenoid air valves, electric motors, and other control components disposed about the apparatus which will be explained hereinafter.

Structure and Function

The pair of roller chains 52 is supported on and trained about sprockets 80 which are mounted on the shafts 82 journalled in the bearings 84 attached to the frame 50. Beneath the chains 52 a pair of slide bars 86 support a pair of slides 88, each slide 88 carrying a pivoted feed tooth 90 which is biased by a spring 92 against a stop 94 to a position for engaging the rear edges of plates 54 carried beneath the chains 52 by the lower reaches thereof. The slides 88 are reciprocated on the bars 86 by drag links 96, each of which is pivotably attached at one end thereof to one of a third pair of roller chains 98, and at the other end thereof is pivotably attached to one of the slides 88. The chains 98 are trained around the drive sprockets 100 and the driven sprockets 102, and are driven in the direction as indicated by the arrows adjacent thereto in FIG. 8 by a chain drive 104 from a gearmotor 106. Thus, movement of the chain 98 as indicated results in the reciprocation of the slide 88 on the bars 86, and the teeth 90 engage a plate 54 at each stroke toward the front of the frame 50, indexing that plate 54 and the chains 52 and all the plates 54 in the direction as indicated by the arrow adjacent thereto in FIG. 8 until the drag links 96 go around the sprockets 100, during which movement the links 96 pivot downwardly, thereby engaging and forcing downwardly the connecting pins 108 extending through the free ends of levers 110 which are pivoted on the slides 88. The levers 110 are connected to intermediate points on the teeth 90 by the connecting rods 112, so that when the pins 108 move downwardly, the teeth 90 are pulled downwardly out of engagement with the particular plate 54 with which they have been engaged, thereby halting the indexing of the plates 54 at precisely the same location at each indexing stroke without any real likelihood of the indexing becoming out-of-phase with the various stations. At the forwardmost travel of the slide 88, one of them contacts and actuates a limit switch 113, which signals the panel 78 to initiate label applying at station 58 and transfer applying at station 60. When the links 96 pivot downwardly, their free ends continue around the sprockets 100, and the links 96 are returned toward the rear of the frame 50 by continued movement of the chains 98, carrying the slides 88 along, and when the slides 88 have been reciprocated to their rearmost positions relative to the frame 50, a limit switch 114 is actuated by one slide 88 and acts through the control panel 78 to stop the gearmotor 106. The distance between sprockets 100 and 102 is such that the teeth 90 are somewhat behind the rear edge of the plate 54 next succeeding the plate 54 just indexed when the slides 88 are in their rearmost positions, so that when the gearmotor 106 is started for another index (as explained hereinafter), the links 96 pivot upwardly as their free ends complete their travel around the sprockets 102, allowing the teeth 90 to rise up behind the next succeeding plate 54 to engage its rear edge for indexing movement as the slides 88 make their forward stroke. This indexing mechanism results in a very accurate and uniform index, which is important for proper functioning of the apparatus at the stations 58, 60 and 62.

The loading station 56 includes a loading plate 116 which surrounds the carrier plate 54 dwelling thereat at its side edges and front edge, and the plate 116 is pivoted at its front edge for lifting by an air cylinder 118, while the plate 54 is indexed into dwell position at the station 56. The air cylinder 118 is actuated to lift plate 116 by the circuitry of the panel 78 from the same signal which starts the gearmotor 106 for an index (as explained hereafter), and the signal for lowering plate 116 comes from the limit switch 113 at the end of the index as previously explained. The plates 54 are provided with clearance slots 120, which may be in multiple positions, or may be adjustably positioned therein, to accommodate various stocking lengths, and the stocking folding elements 66 must pass through the slots 120 at the folding station 62, therefore, a limit switch 122 is provided at the loading station 56 in alignment with the lifting path of the folding elements 66. If the roller actuator of the switch 122 lies within one of the slots 120 of a plate 54 dwelling at the loading station 56, then the control panel 78 will allow the next index motion of the plates 54 to occur; but if the actuator of switch 122 engages the plates 54, indicating non-alignment of a slot with the lifting rod in the folding station, then the switch 122 will be actuated and the circuitry in the control panel 78 will not allow the plates 54 to index.

At the label applying station 58 as shown in FIG. 9, a spindle 124 is provided to carry a roll 126 of narrow, waxy paper W to which is adhered a multiplicity of printed self-adhering labels L in spaced apart disposition underneath the paper W as it is fed from the roll 126 into a label feeding means or feeder 128. The label feeder 128 is a wedge-shaped member with its thin edge 130 pointed in the direction of the desired label feed, and the paper W is fed under the feeder 128, around the thin edge 130 thereof, and in reverse direction thereover, by the pull of a driven friction surfaced pair of label feed rolls 132.

The sharp reversal of direction of travel of the paper W around the edge 130 causes the relatively stiffer labels L to separate from the waxy paper W and to feed straight away from the label feeder 128 in the extended plane of the underside thereof. Two spaced series of jets 134 of compressed air are provided in a guide block 135 above the edge 130 to blow air down at the separation point of labels L and paper W to facilitate the separation thereof and to position the labels L on a label folding mechanism 140. Longitudinal grooves 136 on the underside of the block 135 facilitate the application of air to control the labels L as they feed onto a folding portion 142 and a base portion 144 of the folding mechanism 140 by blowing opposite thereto. Both the folding portions 142 and the base portion 144 have suction holes 146 in the upper surfaces thereof as viewed when the folding portion 142 is disposed as shown in FIG. 9 in a label receiving disposition as an adjacent, aligned extension of the base portion 144 below the path of the labels L being fed away from the label feeder 128.

Labels L so fed are received onto the top surfaces of the portions 142 and 144 and are held thereagainst by application of suitable suction through the holes 146. The labels L are fed until the trailing edge of a label L just breaks away from the paper W and the leading edge of the label L breaks the light beam of a photo-cell detector 148 adjustably disposed for monitoring said leading edge through an opening 150 in the base portion 144 at the end thereof away from the folding portion 142. Breaking the light beam creates a signal at the photo-cell detector 148 which is transmitted to the circuitry of the control panel 78 to cause the label feed motor 152, which drives the pair of feed rolls 132 and was started by action of the circuitry of the panel 78 in response to a signal from a limit switch 153, to be halted with a label L suitably positioned on the label folding mechanism 140 for subsequent folding thereby.

The folding mechanism 140 is moved from a label receiving position spaced from the carrier plates 54 to a label applying position by means that includes an application slide 154 on which the folding and base portions are attached and which is slidably mounted on inclined rods 156 which are in turn mounted on the left side of the frame 50 at a suitable upward inclination (such as about 10°) of the rods 156 toward the underside of the left end of the plate 54 dwelling at the label applying station 58. An air cylinder 160 connected between the base 156 and the slide 154 may be actuated by the panel 78 in response to a signal from the limit switch 113 to move the folding and base portions obliquely from a position for receiving labels L to an application position where the base portion 144 fits within a rectangular opening 162 provided in the left end of the plate 54 dwelling at the label applying station 58 (such an opening 162 is provided in each plate 54) and where the upper surface of the base portion 144 is flush with the upper surface of the plate 54 at the station 58 under an end portion of a pair of stockings P positioned on the carrier plate 54 with at least a part of the underside of the stocking pair end portion exposed under the plate 54. The folding portion 142 is supported in label receiving position by the springs 164 which are compressed by guide bolts 165 extending between the folding portion 142 and a hinged member 166 which is pivoted on the slide 154 and has attached a pinion 168 which is concentric with the pivot point. A rack 170 meshes with the opinion 168 and is connected for lengthwise movement to the piston rod of an air cylinder 172 which is mounted on the slide 154, and a limit switch 174 is connected to the frame and disposed for actuation by the slide 154 as the base portion 144 reaches its aforesaid application position. Actuation of the switch 174 signals the control panel circuitry to cause extension of the piston rod of the cylinder 172 and of the rack 170, thereby rotating the hinged member 166 to fold the folding portion 142 and the label L carried thereon over the base portion 144 and over the tops of a pair of stockings P which would normally be positioned evenly with the left end of the plate 54 and over the rectangular opening 162 therein. A U-shaped presser foot 176 is disposed on the frame 50 above the opening 162 of a plate dwelling at the station 58 for actuation by an air cylinder 178 to clamp the tops of the stocking pair P around the three closed sides of the opening 162 for undisturbed label application within the opening. The springs 164 disposed between the folding portion 142 and the hinged member 166 permit accommodation to various thicknesses of the tops of stocking pairs P while applying sufficient pressure to the labels folded thereover to assure their firm adherence to the stocking pair P. A limit switch 180 is actuated by the folding portion 142 (when folded over the base portion 144 to face parallel thereto) to signal the panel 78 to cause the cylinder 172 to retract the rack 170 to return the folding portion 142 to label receiving disposition. A limit switch 181 is actuated by the folding portion 142 upon its return to label receiving disposition to signal the circuitry of the panel 78 to cause the cylinder 160 to return the slide 154 and the folding mechanism 140 to label receiving position. Arrival of the slide 154 at the label receiving position actuates the limit switch 153 to start feeding another label L to the folding mechanism 140 as previously explained.

At the transfer applying station 60 a spindle 182 mounted on a transfer frame 184 attached to the frame 50 carries a roll 186 of transfer strip 188 on which is printed a legend or indicia for transfer to stockings. A powered spindle 190 mounted on the frame 184 and suitably spaced away from the spindle 182 serves to wind up the strip 188 into another roll after transfer of the indicia thereon, and a pair of friction-surfaced strip feed rolls 191 are driven by a transfer drive motor 192 to feed the strip 188 a predetermined distance corresponding to the spacing of the succeeding patterns of indicia thereon by timed running of the motor 192 after each transfer operation for a predetermined period as determined by an adjustable timing device 194. The motor 192 also drives the spindle 190 through a suitable friction connection. Between the spindles 182 and 190 the transfer strip 188 is threaded around guides 196 and 198 and under a rectangular holddown frame 200 supported by a hot transfer iron slide 202 over, but spaced from and retained out of interference with, the stocking pairs P carried on the plates 54 beneath the transfer station 60. Transfer frame 184 is fully adjustable to apply transfers in suitable locations on stocking feet.

The slide 202 is supported from the frame 184 by an air cylinder 204 normally in retracted position holding a convention hot transfer iron 206 attached to the slide 202 above the bottom surface of the frame 200. The iron 206 is conventionally heated by electrical current supplied through the circuitry of the panel 78. Initial extension of the cylinder 204 as caused by the circuitry of the panel 78, as signalled by the limit switch 113, lowers the slide 202, allowing the holddown frame 200 to precede the hot iron 206 downwardly to position the transfer strip 188 against the upper stocking of the superposed stocking pair P carried on the plate 54 then dwelling at the station 60. The holddown contact pressure produced by the weight of the holddown frame 200 is augmented by force from an extension spring 208 connecting the frame 200 and the hot iron slide 202 as the slide 202 is moved farther downwardly by full extension of the cylinder 204 until the hot iron 206 passes fully through the holddown frame 200, which is open interiorly to receive the transfer iron. The transfer iron 206 presses against the transfer strip and stocking to transfer the indicia on the under surface thereof to the uppermost stocking of the stocking pair P then dwelling thereunder.

The adjustable stop 210 atop the clamping frame 200 is set to actuate the limit switch 212 carried on the slide 202 when the hot iron 206 "kisses" the uppermost stocking, and thereby signals the panel 78 to cause the cylinder 204 to retract to raise the hot iron slide 202 first and then the rectangular frame 200 by engagement of the dog 213 of the frame 200 by the projection 214 of the slide 202. Full retraction of the slide 202 causes an adjustable dog 216 connected thereto to actuate a limit switch 218, which is connected to the transfer frame 184, to signal the circuitry in the panel 78 to start the timing device 194 to feed out the next succeeding pattern of indicia on the transfer strip 188. The guides 196 are suitably positioned so that the length of the transfer strip between them is essentially the same for both the upper and lower positions of the clamping frame 200.

A carrier plate 54 upon arrival of the folding station 62 is checked, for the presence of the top of a stocking pair P covering the rectangular opening 162 of the plate 54, by the photo-cell unit 220 whose light beam passes through the opening 162. If a stocking top is present, the photo-cell unit signals the circuitry of the panel 78 to start a gearmotor 22 which drives the second pair of roller chains 68. Thereupon, the stocking folding rod 66 which had been resting in horizontal disposition at right angles to the length of the plate 54 just below the folding station 62 rises vertically with the chains 68, passes transversely through the suitable one of the clearance slots 120 in the plate 54 dwelling at the folding station 62, and engages the stocking pair P intermediately of its ends to lift it from the plate 54 and to support the stocking pair P in folded condition over the rod 66, with means moving the rod to transport it upwardly from the folding station 62 and horizontally to the hanger clip inserting station 70 through a confining passage 223 formed by inner and outer generally parallel, spaced, opposed and facing walls 224 and 226 which are located above the plate 54 and formed from sheet metal to conform to the path of the elements 66 as they rise vertically, move 90° around one of the four sets of sprockets 228 about which the chains 68 are trained in a generally rectangular pattern, and then move horizontally across the rear of the frame 50 to the hanger clip inserting station 70.

Since a stocking pair P is originally placed on a plate 54 with the feet of the stockings angled toward the front of the frame 50 and the heel disposed toward the rear, when a stocking pair P is lifted by a horizontally disposed folding rod 66, the foot end of the stocking, at least, will tend to hang inclined toward the front of the apparatus. Therefore, the confining passage 223 has a side wall 230, suitably formed from a transparent plastic material, which is perpendicular to the parallel walls 224 and 226, and serves to close the passage and align the guide the end portions of a folded stocking pair P in proper position for hanger clip insertion and discharge. The opposed walls 224 and 226 are adjustably spaced apart, and are normally adjusted in the area approaching the clip inserting station to be spaced apart a distance less than the unrestricted thickness of the stocking pair P to put frictional drag or resistance on the stocking pair P advancing through the passage 223. This drag serves to tension the stocking pair P over the folding rod 66 to prevent displacement during hanger clip insertion.

Each of the folding rods 66 is formed with an open slot 323 extending longitudinally and facing the fold in the stockings to accommodate receipt of a portion of a hanger clip therein.

A folding rod 66 arriving at the clip inserting station 70 actuates a limit switch 234 through mutual contact with a pivoted actuating arm 236 to signal the circuitry in the panel 78 to stop the gearmotor 222 (which is equipped with an automatic brake) so that the portion of the stocking pair P stretched over the open slot 232 of the rod 66 is positioned exactly in line to be straddled by the short and long opposing prongs S and G of a hanger clip C as the long prong G is inserted within, and the short prong S slipped over, the fold of the stocking pair P, and the rod 66 is positioned exactly in line to receive the long prong G within its slot 232.

A hanger clip inserting mechanism 237 located at the clip inserting station 70 includes a vertical stack of hanger clips C and means for supplying clips in the form of vertical guide rods 240 to a housing 242 that has a chamber 243 that receives clips C from the supply and accommodate reciprocal movement of a pusher element 238 therein to insert clips into the fold of a stocking, with the chamber aligned and opening toward the stocking fold on the folding rod 66. Means for supplying the clips C into the chamber 243 comprises means for reciprocating the pusher element 238 which includes an air cylinder 244 mounted on the housing 242 and connected to the pusher element 238 to hold it in normally retracted position where the lowermost of the clips C stacked above the element may drop into position inside of the chamber 243 ahead of the insertion end 246 of the pusher element 238 at each reciprocation thereof for engagement and insertion thereby onto the fold of the stocking pair P positioned therefor at the inserting station 70, with a portion of the clip being received in the slot 323 of the folding rod 66. The insertion end 246 of the pusher element 238 is shaped to extend into the hook portion of the clip C for engagement at the base of the hook to apply inserting pressure thereat, which provides guided positioning insertion and opening of the clip onto the stocking pair fold.

A limit switch 247 signals the circuitry of the panel 78 to cause the cylinder 244 to move the pusher element 238 to insert a clip C upon arrival of the folding rod 66 at the inserting station 70, and the element 238 actuates a limit switch 248 at the end of its insertion movement to signal the circuitry of the panel 78 to cause the cylinder 244 to move in reverse direction to restore the element 238 to normal retracted position.

The just-mentioned actuation of the switch 248 at the same time signals the circuitry of panel 78 to cause an air cylinder 250 to move a pivoted retracting arm 252 in a direction to withdraw the rod 66 from within the fold of the stocking pair P located at the clip inserting station 70. The arm 252 has a slotted portion 254 at its extending end, adjacent the insertion station 70; into which a roller 256 attached to the rear end of the folding rod 66 has traveled in readiness for timely longitudinal withdrawal of motion of rod 66 transversely of the direction of motion of the chains 68. When the arm 252 has reached a position fully retracting the rod 66 from the stocking pair P, the arm 252 actuates a limit switch 256 which signals the circuitry of the panel 78 to actuate means for moving a discharge means 72 movable to allow stocking discharge and comprising a pivoted drop plate 258 (forming a section of the horizontal wall portion of the inner wall 224 of the confining passage 223 under the stockings at the station 70) to withdraw from under the stocking pair P at the inserting station 70 by action of an air cylinder 259, thereby discharging the stocking pair P onto the conveyor 74 for transport to the front of the apparatus. The pivoted drop plate 258 forms the terminal portion of the inner wall 224, is pivoted along its rear edge, and has a length greater than that of a folded stocking pair P.

The switch 256 upon actuation by the arm 252 also signals the circuitry of the panel 78 to start a gearmotor 259' which drives the conveyor 74, and to start a comparatively slow air-passage-restricted, reverse movement of the cylinder 250 to reverse the movement of the arm 252, thereby returning the folding rod 66 to its normal position cantilivered forward of the chains 68. Near the completion of this reverse movement, the arm 252 actuates a limit switch 260 which signals the circuitry of the panel 78 to return the drop plate 258 to its normal position as a section of the inner wall 224, and to stop the gearmotor 259 for the conveyor 74.

A framework 262, which supports the chains 68, the guides 224 and 226, the clip inserting station 70, the conveyor 74, and their associated elements, is mounted for slidable, adjustable positioning on the frame 50 so that the folding rods 66 may be positioned suitably longitudinally of the carrier plates 54 for accommodating stocking pairs P of any suitable length. The housing 242 is cantilivered from the framework 262 so that a folded stocking pair P may be discharged freely from the clip inserting station 70 upon withdrawal of the folding rod 66.

Suitable wiring and tubing, a compressed air supply and a surge tank therefor, a vacuum pump, and various other usual arrangements and components of such an apparatus as this, and the circuitry in and to and from that control panel 78, are all of conventional design and arrangement and would be obvious to those skilled in the art such that it is not necessary to unduly encumber the present disclosure with a more detailed explanation than that already provided.

Operation

Figure 2:
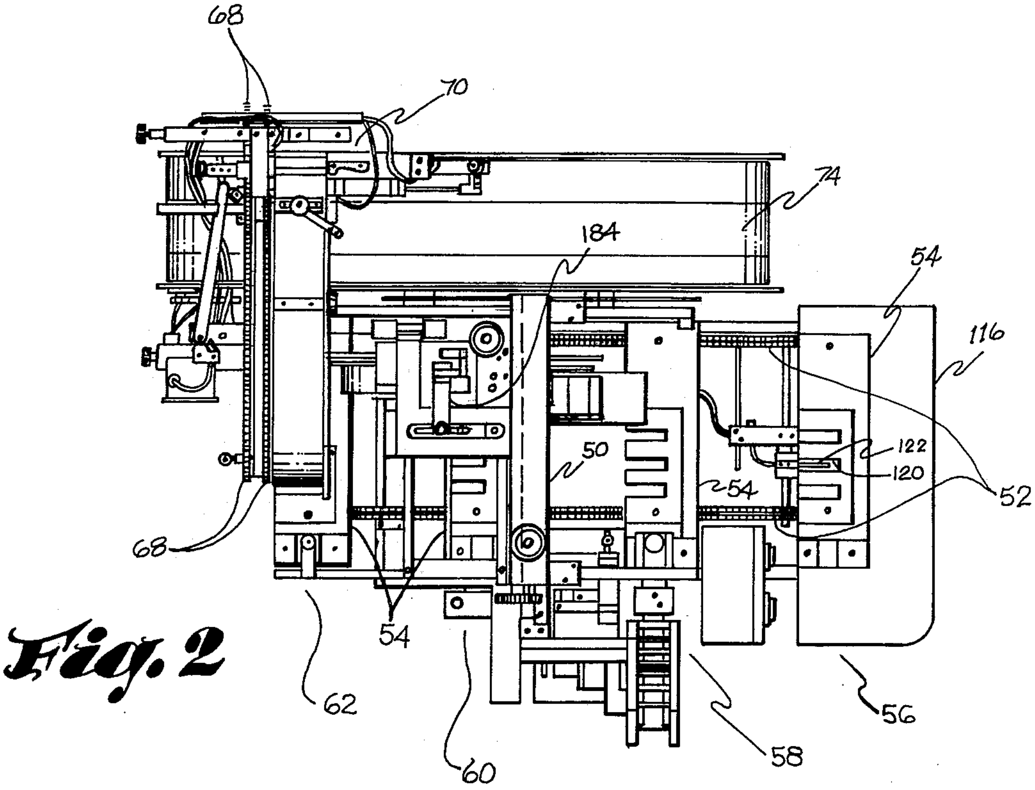
FIG. 2 is a plan view of the machine of FIG. 1.
Figure 6:
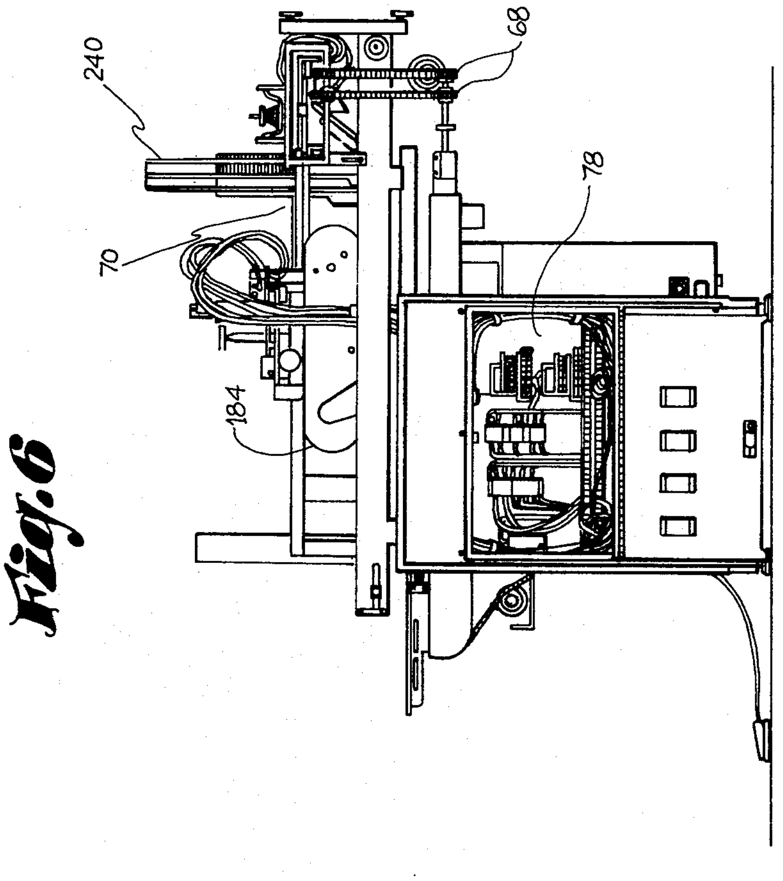
FIG. 6 is a right-side elevation of the machine of FIG. 1.

An attendant positioned at the front of this preferred embodiment of the apparatus of the present invention loads and unloads the apparatus and controls its operation as necessary. The operation of the apparatus will ordinarily be fully automatic, i.e., the carrier plates 54 will be indexed automatically so long as all operations are functioning properly. The attendant needs only to take stockings from a stack positioned handily nearby and successively position them in superposed pairs suitably on the carrier plates 54, which dwell at the loading station 56 as shown in FIG. 2. The tops of the stocking pairs P must be aligned with the left edges of the plates 54 and centered over the widths of the rectangular openings 162 in the plates 54, and the back sides of the stocking pairs P must be generally parallel with the rear edges of the plates 54 while the foot portions of the pairs P may be disposed straight or angularly with the length of the plates 54 suitably in accordance with stocking construction and configuration. The loading plate 116 forms a convenient addition to the working surface about the plate 54 dwelling at station 56 so that the positioning of a pair P may be done rapidly before automatic indexing of the plates 54 occurs.

Each automatic cycle begins when the retracting arm 252 returns the folding rod 66 to project frontwardly from the chains 68 and actuates the limit switch 260 which signals the circuitry of the panel 78 to start the gear motor 106 to index the carrier plates 54 as previously described. Assuming that the carrier plate 54 dwelling at the folding station 62 after being indexed carries a stocking pair P whose stocking tops are suitably positioned over the rectangular opening 162, the photo-cell unit 220 will detect the presence of the stocking tops and will signal the circuitry of the panel 78 to initiate the sequence of events previously described in which one of the folding elements 66 lifts the stocking pair P from the folding station 62 and transports it to the hanger clip inserting station for insertion of hanger clip C and subsequent longitudinal withdrawal of folding element 66, the drop plate 258 discharges the stocking pair P onto the conveyor 74, and the arm 252 returns the folding element 66 to initiate a new indexing cycle as described at the beginning of this paragraph.

During the time required for the completion of the functions described in the preceding paragraph each of the following operations takes place, with the carrier plates in a dwell condition between indexings:

(a) the operator has time to load another superposed stocking pair P onto the carrier plate 54 at the loading station 56;

(b) the application slide 154 advances under the stocking tops resting on the carrier plate 54 at the label applying station 58, and the label folding mechanism 140 applies a label L and is retracted thereafter and supplied with another label L;

(c) the holddown frame 200 descends to hold the transfer strip 188 against the stockings resting on the carrier plate 54 at the transfer applying station 60, after which the hot transfer iron 206 descends and transfer indicia to the uppermost of the stockings, all of the above elements are retracted upwardly, and then a fresh section of the transfer strip 188 is advanced to the frame 200; and (d) the operator may remove folded stocking pairs, complete with labels, transferred indicia, and hanger clips applied thereto, from the collection station for placement in containers.

Thus, the disclosed embodiment of the present invention provides an automatic stocking handling apparatus for affixing labels and transfers, for folding the stockings and inserting hanger clips in the folds, and for collecting the processed stockings for further handling, without the requirement for skilled manual operators, and in a compact arrangement. The particular embodiment disclosed in full detail herein and illustrated in the drawings has been provided for disclosure purposes only and is not intended to limit the scope of the present invention, which is to be determined by the scope of the appended claims, especially in view of the many commercial forms taken by labels, transfers, hanger clips, and manually operated or individual label- and transfer-affixing devices which might be used in this invention within the scope of the appended claims.

I claim:

1. Apparatus for handling stockings to affix labels, transfers and hanger clips thereto comprising a carrier plate for supporting and conveying a pair of superposed stockings transversely from a loading station through label and transfer applying stations to a folding station, means for indexing said carrier plate through said stations, means at said label applying station engagable with an end portion of a pair of stockings at a side edge of said carrier plate and operable to fold an adhesive coated label over the end portion of said stockings and apply pressure thereto sufficient to cause the label to adhere to said end portion, means at said transfer applying station for transferring indicia from a transfer strip onto one of said stockings by a hot transfer iron, stocking folding means at said folding station engagable under said pair of stockings intermediate their ends to lift said stockings from said carrier plate and thereby support said stockings in folded condition, means for moving said stocking folding means to lift said stockings and to transport them to a hanger clip inserting station, means for inserting a hanger clip from a supply into said folded stockings, and means for discharging said stockings from said hanger clip inserting station to a collection station.

2. Apparatus for handling stockings according to claim 1 and characterized further in that said plate indexing means indexes said plate from said loading station through said label and transfer applying stations linearly, said means for moving said stocking folding means moves said stocking folding means and supported stockings transverse to the linear movement of the carrier plate, and means are provided for conveying the stockings at said collection station parallel with but opposite the linear movement of the plate.

3. Apparatus for handling stockings according to claim 1 and characterized further in that said means at said label applying station comprises a folding mechanism having a base portion and a folding portion, said base portion being positionable at one side of said stocking pair end portion on said carrier plate, said folding portion being pivotable from a position adjacent and aligned with said base portion to a position facing said base portion, means for positioning a label on the base and folding portion when said portions are aligned for positioning the label on the base portion at one side of the stocking pair end portion on the carrier plate, said folding mechanism including means for pivoting said folding portion to face said base portion and thereby folding the label over the stocking pair end portion.

4. Apparatus for handling stockings according to claim 3 and characterized further by means for moving said folding mechanism from a label receiving position spaced from said carrier plate to a label applying position at said carrier plate.

5. Apparatus for handling stockings according to claim 4 and characterized further in that said means for moving said folding mechanism is operable to move said base portion obliquely from said label receiving position to said label applying position.

6. Apparatus for handling stockings according to claim 3 and characterized further in that said means for positioning a label on said base and folding portions includes means for directing an air jet onto the label from opposite said portions to facilitate positioning thereon.

7. Apparatus for handling stockings according to claim 3 and characterized further in that said folding mechanism includes means for drawing suction through said base and folding portions to facilitate retention of the label thereon.

8. Apparatus for handling stockings according to claim 3 and characterized further in that said folding portion has a pressure plate mounted thereon with spring means urging the pressure plate outwardly to apply pressure against the folded label and stocking pair end portion to facilitate adhesive application of the label to the stockings.

9. Apparatus for handling stockings according to claim 1 and characterized further in that said indicia transferring means at said transfer applying station comprises means for feeding a transfer strip to a position over said pair of stockings, a hot transfer iron movable against said transfer strip and stockings to transfer indicia from the strip to the adjacent stocking, and means for moving said transfer iron.

10. Apparatus for handling stockings according to claim 9 and characterized further by a movable transfer holddown frame under which the transfer strip is fed by said feeding means, means for moving said holddown frame from a position spaced from said stockings for retaining said transfer strip out of interference with stockings during indexing of said carrier plate to a position in transfer positioning contact with said stockings, and said holddown frame being open interiorly to accommodate movement of said hot transfer iron therewithin against said transfer strip and stockings.

11. Apparatus for handling stockings according to claim 10 and characterized further by spring means connecting said holddown frame and said hot transfer iron to apply a holddown pressure against said frame when said iron is in transferring position against said transfer strip and stockings.

12. Apparatus for handling stockings according to claim 1 and characterized further in that said carrier plate has a slot intermediate its side edges to accommodate movement of said stocking folding means therethrough in engaging and folding said stockings, and said stocking folding means comprises a horizontal rod movable vertically through said slot into engagement with said stockings.

13. Apparatus for handling stockings according to claim 12 and characterized further by a pair of opposed and spaced passage-forming walls extending from above said carrier plate at said folding station to said hanger clip inserting station, said walls defining a passage through which said rod and folded stockings move from said folding station to said hanger clip inserting station for proper positioning of said stockings for hanger clip insertion and subsequent discharge.

14. Apparatus for handling stockings according to claim 13 and characterized further by a side wall connecting said passage forming walls and closing the passage side thereat, said side wall engaging stockings moving through said passage to maintain the stockings on the folding rod in proper hanger clip inserting and discharge position.

15. Apparatus for handling stockings according to claim 13 and characterized further in that said passage-forming walls extend vertically from said folding station and horizontally to said hanger clip inserting station.

16. Apparatus for handling stockings according to claim 15 and characterized further in that one of said passage-forming walls has a horizontal section thereof under the stockings at said hanger clip inserting station and said horizontal section is movable to open said passage downwardly and allow said stockings to discharge therefrom, said means for discharging stockings including said horizontal section and means for moving said section.

17. Apparatus for handling stockings according to claim 13 and characterized further in that said passage-forming walls are spaced apart at said hanger clip inserting station a distance less than the unrestricted thickness of said folded stockings so as to provide resistance to movement of said stockings therein and thereby tension said stockings over said rod to prevent displacement thereof during hanger clip insertion.

18. Apparatus for handling stockings according to claim 12 and characterized further in that said rod disposes said folded stockings for hanger clip insertion at said hanger clip inserting station and is formed with an open slot facing the fold of said stockings to accommodate receipt therein of a portion of a clip inwardly of the fold of the stockings.

19. Apparatus for handling stockings according to claim 18 and characterized further by a hanger clip inserting mechanism at said hanger clip inserting station, said mechanism comprising a housing having a hanger clip receiving and guiding chamber aligned with and opening at the fold of said stockings when said stockings are in position for hanger clip insertion, means for supplying hanger clips singly into said chamber, a pusher element slidable in said chamber and engagable with the end of a hanger clip therein, and means for reciprocating said pusher element in said chamber to insert a hanger clip from the chamber into the folding rod slot and fold.

20. Apparatus for handling stockings according to claim 19 and characterized further in that said means for supplying hanger clips comprises a support for a vertical stack of hanger clips above said chamber with the lowermost hanger clip in said stack being in said chamber and supporting the hanger clips thereabove for feeding of a hanger clip into said chamber upon each hanger clip inserting reciprocation of said pusher element.

21. Apparatus for handling stockings according to claim 18 and characterized further by means at said hanger clip inserting station for withdrawing said folding rod from said stocking fold after hanger clip insertion to permit discharge of said stockings to said collection station.

22. Apparatus for handling stockings according to claim 21 and characterized further in that said means for discharging stockings comprises a horizontal wall section at said hanger clip inserting station and on which stockings are supported in horizontal disposition for hanger clip insertion, said horizontal section being movable to allow stockings to discharge therefrom for collection at said collection station, and means for moving said horizontal section.

23. Apparatus for handling stockings according to claim 22 and characterized further in that said horizontal section is pivoted along one edge for downward pivoting to allow stockings to slide therefrom.

24. Apparatus for handling stockings according to claim 22 and characterized further in that said discharging means includes a conveyor onto which stockings are discharged from said horizontal section, said conveyor transporting stockings at said collection station.

* * * * *